United States Patent [19]

Cullen et al.

[11] Patent Number: 4,947,957

[45] Date of Patent: Aug. 14, 1990

[54] REGENERABLE DESICCANT CARTRIDGE FOR AUTOMOTIVE MUFFLER

[75] Inventors: John S. Cullen, Buffalo; Samuel A. Incorvia, Tonawanda, both of N.Y.

[73] Assignee: Multiform Desiccants, Inc., Buffalo, N.Y.

[21] Appl. No.: 367,146

[22] Filed: Jun. 16, 1989

[51] Int. Cl.$^5$ ............................................. F01N 1/24
[52] U.S. Cl. ................................. 181/258; 181/252; 181/266; 181/272
[58] Field of Search ................ 181/227, 231, 243–245, 181/258, 265, 272, 252, 266; 60/299, 311; 55/276

[56] References Cited

U.S. PATENT DOCUMENTS

| | | | |
|---|---|---|---|
| 1,554,534 | 9/1925 | Straussler | 181/258 |
| 1,575,657 | 3/1926 | Straussler | 181/258 |
| 1,627,324 | 5/1927 | Green | 181/258 |
| 4,580,656 | 4/1986 | Fukuda | 181/272 X |

Primary Examiner—Benjamin R. Fuller
Attorney, Agent, or Firm—Joseph P. Gastel

[57] ABSTRACT

A regenerable desiccant cartridge for an automotive muffler including a tubular wire mesh sleeve containing adsorbent and having opposite end portions, an elongated metal base plate extending the entire distance of the sleeve and having end portions crimped over the open ends of the sleeve, the base plate also including rounded corners.

20 Claims, 2 Drawing Sheets

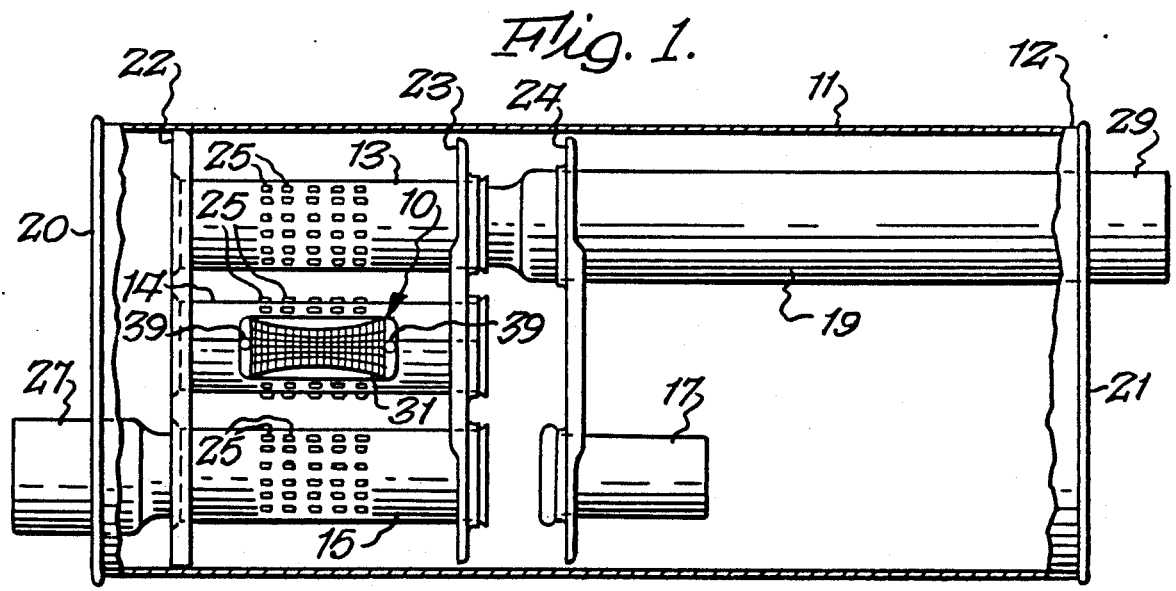
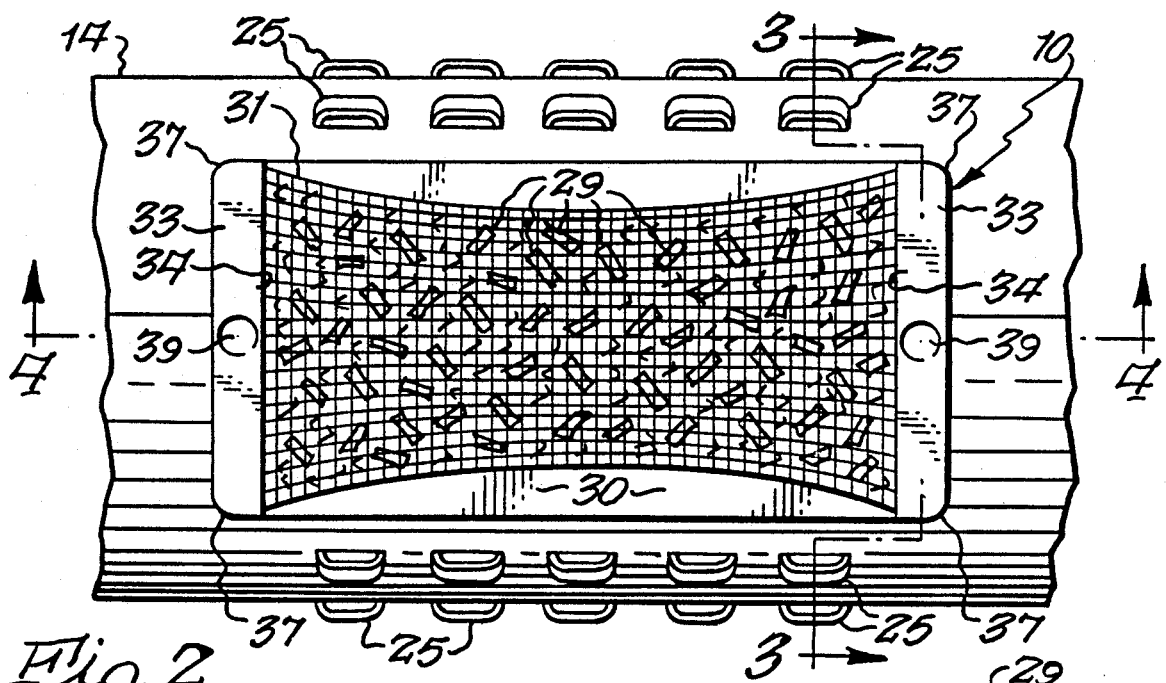
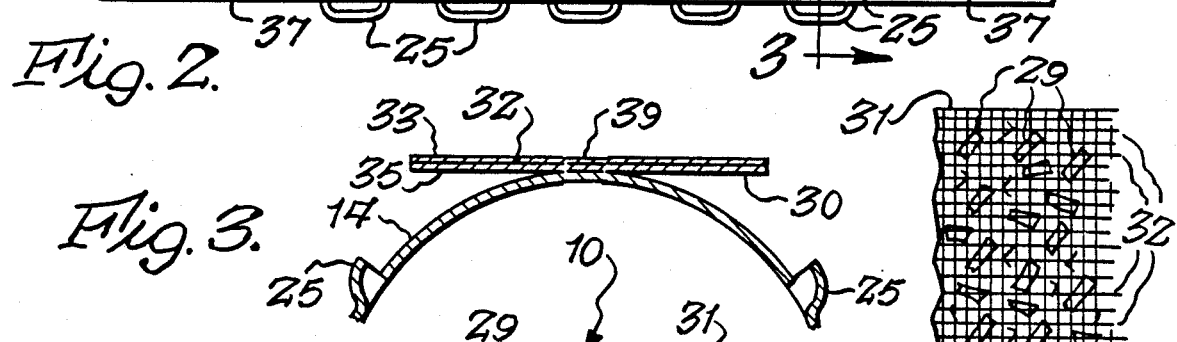
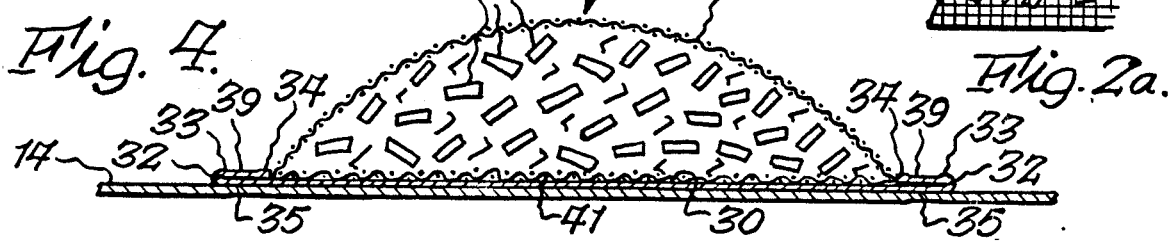

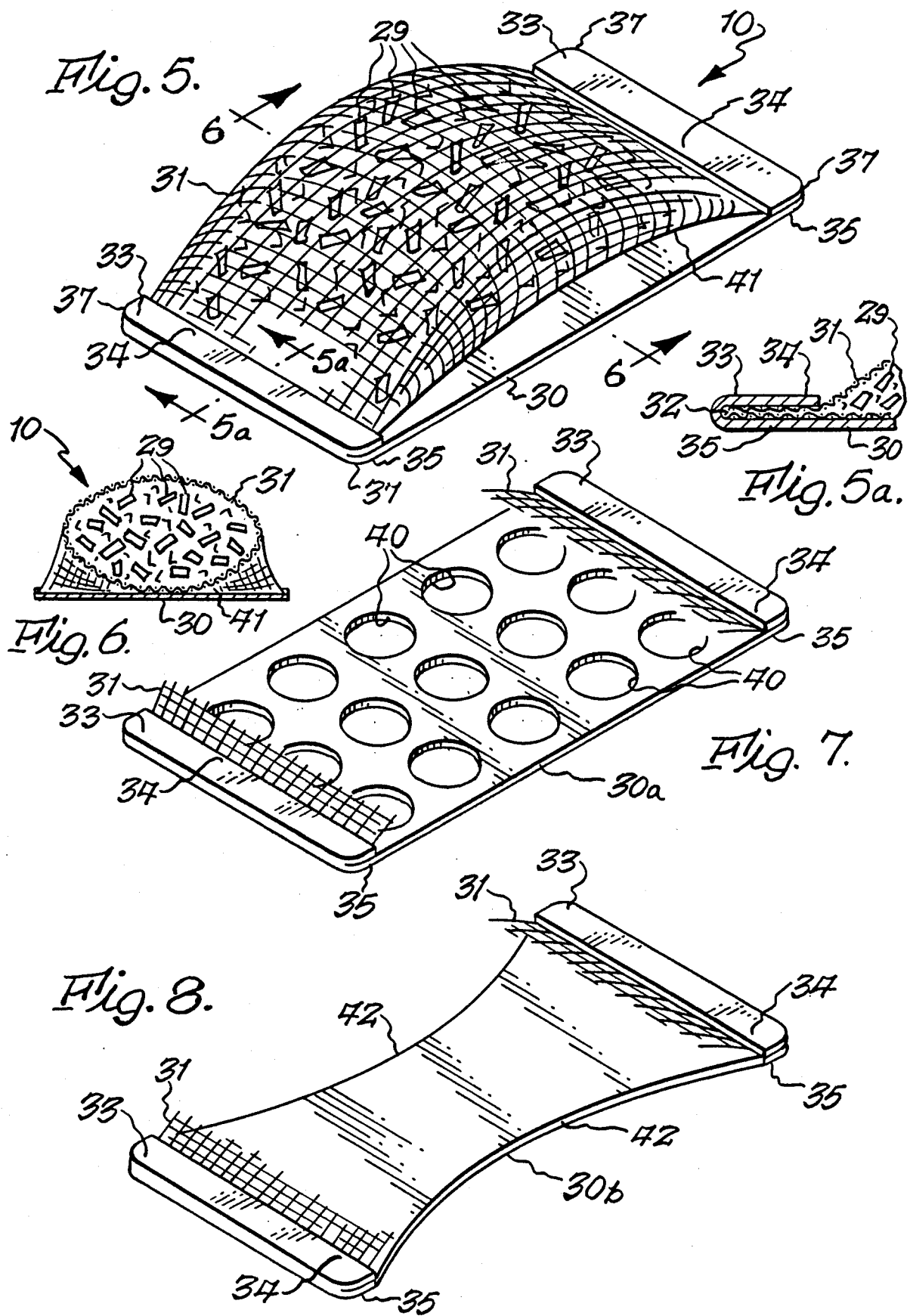

REGENERABLE DESICCANT CARTRIDGE FOR AUTOMOTIVE MUFFLER

BACKGROUND OF THE INVENTION

The present invention relates to a regenerable desiccant cartridge for an automotive muffler.

By way of background, regenerable desiccant devices for mufflers are known. One type over which the present cartridge is an improvement comprises a tubular wire mesh sleeve containing desiccant pellets. This sleeve is cut from elongated wire mesh tubing of indeterminate length and thus the ends of the sleeve contain the sharp jagged ends of the wire mesh. Each open end of the sleeve is closed by sandwiching it between two strips of metal and welding them to each other by a series of spot welds. However, the sharp ends of the wire of the sleeve extend outwardly beyond the metal strips. In addition, the metal strips each have four sharp corners which can puncture the sleeves of other cartridges with which they are stored. Furthermore, the jagged ends can cause cartridges to catch on each other. Additionally, the sleeves are extremely flexible, and thus there is no fixed length of the cartridges which permits them to be fastened to mufflers by automated equipment. It is with overcoming the deficiencies of the foregoing type of desiccant cartridge that the present invention is concerned.

SUMMARY OF THE INVENTION

It is one object of the present invention to provide an improved regenerable desiccant cartridge for an automotive muffler which is of fixed length and sufficiently rigid so that it can be handled by automated equipment.

Another object of the present invention is to provide an improved desiccant cartridge for an automotive muffler which does not contain sharp corners which can puncture other cartridges with which it may be stored or which can cause injury to personnel handling such cartridges.

A further object of the present invention is to provide an improved desiccant cartridge for an automotive muffler which does not have sharp jagged wires protruding therefrom. Other objects and attendant advantages of the present invention will readily be perceived hereafter.

The present invention relates to a regenerable cartridge for an automotive muffler having an exhaust gas conduit therein comprising a tubular wire mesh sleeve having opposite end portions, adsorbent in said sleeve, an elongated metal base plate, opposite end portions on said base plate, means for securing said opposite end portions of said sleeve to said opposite end portions of said base plate for causing said sleeve to lie in contiguous relationship to said base plate and stabilize said sleeve against distortion.

The various aspects of the present invention will be more fully understood when the following portions of the specification are read in conjunction with the accompanying drawings wherein:

BRIEF DESCRIPTION OF THE DRAWINGS

FIG. 1 is a plan view of an automotive muffler, partially broken away, and showing the improved regenerable desiccant device mounted on one of the internal pipes in the muffler;

FIG. 2 is a fragmentary enlarged view of the regenerable desiccant device mounted on the pipe within the muffler;

FIG. 2a is a fragmentary plan view showing the ragged sharp edges of the wire mesh tubing before it is fastened to the base plate of the regenerable desiccant device;

FIG. 3 is a fragmentary cross sectional view taken substantially along line 3—3 of FIG. 2;

FIG. 4 is a fragmentary cross sectional view taken substantially along line 4—4 of FIG. 2;

FIG. 5 is a perspective view of the regenerable desiccant device of the present invention;

FIG. 5a is a fragmentary cross sectional view taken substantially along line 5a–5a of FIG. 5 and showing the end of the sleeve confined by the crimped end of the base plate;

FIG. 6 is a cross sectional view taken substantially along line 6—6 of FIG. 5;

FIG. 7 is a fragmentary perspective view showing a modified form of base plate; and FIG. 8 is a fragmentary perspective view of still another form of base plate.

DESCRIPTION OF THE PREFERRED EMBODIMENTS

The improved regenerable desiccant device 10 of the present invention is shown in FIG. 1 within cutaway housing 11 of muffler 12 having a plurality of conduits 13, 14, 15, 17 and 19 therein. Housing 11 includes end plates 20 and 21. It also includes internal plates 22, 23 and 24. Internal muffler conduits 13, 14 and 15 have perforations 25 therein through which exhaust gases flow. The ends of conduits 13, 14 and 15 are open, as are the ends of conduit 17. One open end of perforated conduit 15 is in communication with muffler inlet conduit 27 and one open end of perforated conduit 13 is in communication with conduit 19 which has an end portion 29 for attachment to a tail pipe. The opposite ends of conduits 13, 14 and 15 are supported on plates 22 and 23. The opposite ends of conduit 19 are supported on plates 21 and 24. Conduit 17, which has open ends, is supported on plate 24. The inlet conduit 27 extends through plate 20.

The improved regenerable desiccant device 10 is mounted on internal perforated muffler pipe 14 for adsorbing corrosive moisture from the inside of muffler casing 11 when it cools down. When the muffler heats up due to passage of automotive exhaust gases therethrough, the desiccant pellets 29 carried by device 10 will be regenerated and thus prepared for a subsequent moisture adsorbing function.

The improved regenerable desiccant device 10 includes an elongated metal base plate 30 which carries a tubular wire mesh sleeve 31 which contains desiccant pellets. These pellets are preferably molecular sieve, but they may be any suitable adsorbent. Sleeve 31 is cut from an elongated tubular wire mesh member of indeterminate length. During this cutting, the cut ends 32 (FIG. 2a) of the individual wires of the mesh sleeve constitute sharp projections or, stated otherwise, the ends of the sleeve 31 are sharp and ragged. In accordance with one aspect of the present invention, the end portions 33 of base plate 30 are crimped by folding over the extreme end portion 34 of each end of base plate 30 onto the adjacent portion 35 to confine the ragged ends 32 of the wire therebetween. This prevents such ragged sharp ends from cutting people who handle the cartridges 10 and also prevents the cartridges from catching on each other when they are transported in bulk.

The corners 37 of cartridge 10 are rounded, and thus when they are transported in bulk, there are no sharp edges which can puncture the wire mesh sleeves 31 of cartridges with which they are packed. The base plate 30 is rigid and thus stabilizes the sleeve and permits the cartridge 10 to be handled by automated machinery for attaching it to conduit 14, as by spot welding at 39. The base plate 30 of cartridge 10 also permits attachment by automation because it provide a fixed length to the cartridge and also prevents undesired twisting of the sleeve.

A modified base plate 30a is shown in FIG. 7. This base plate is identical in all respects to base plate 30 of the preceding figures except that it contains a plurality of perforations 40 for permitting circulation of exhaust gases therethrough. In this respect, as can be seen from FIG. 6, the unperforated base plate 30 does not obstruct substantial portions of the underside 41 of mesh sleeve 31. However, base plate 30a provides still more opening to the underside of the mesh sleeve 31 in contiguous relationship thereto.

In FIG. 8 a further modified base plate 30b is shown. The base plate 30b is identical in all respects to base plate 30 except that its edges 42 are concave to provide greater exposure to the underside 41 of sleeve 31.

It can thus be seen that the improved regenerable desiccant cartridge of the present invention is manifestly capable of functioning in the above described manner and achieving the above enumerated objects, and while preferred embodiments of the present invention have been disclosed, it will be understood that the present invention is not limited thereto but may be otherwise embodied within the scope of the following claims.

What is claimed is:

1. A regenerable cartridge for an automotive muffler having an exhaust gas conduit therein comprising a tubular wire mesh sleeve having opposite end portions, adsorbent material provided in said sleeve, an elongated metal base plate for attachment to said conduit, opposite end portions on said base plate, means for fixedly securing said opposite end portions of said sleeve to said opposite end portions of said base plate for causing said sleeve to lie in contiguous relationship to said base plate and stabilize said sleeve against distortion.

2. A regenerable cartridge for an automotive muffler as set forth in claim 1 including means on said base plate for securing said base plate to said exhaust gas conduit of said automotive muffler.

3. A regenerable cartridge for an automotive muffler as set forth in claim 2 wherein said securing means comprise central portions on said end portions of said base plate for receiving a weld.

4. A regenerable cartridge for an automotive muffler as set forth in claim 1 wherein said means for fixedly securing said opposite end portions of said sleeve to said opposite end portions of said base plate comprise crimped portions on said end portions of said base plate.

5. A regenerable cartridge for an automotive muffler as set forth in claim 4 wherein said base plate has rounded corners.

6. A regenerable cartridge for an automotive muffler as set forth in claim 4 wherein said opposite end portions of said sleeve comprise ragged sharp cut edges, and wherein said crimped portions enclose said ragged sharp cut edges.

7. A regenerable cartridge for an automotive muffler as set forth in claim 6 wherein said crimped portions are fabricated by turning over extreme outer end portions of said base plate onto adjacent portions thereof and confining said ragged sharp cut edges of said sleeve therebetween.

8. A regenerable cartridge for an automotive muffler as set forth in claim 1 wherein said elongated metal base plate includes perforations therein for permitting hot exhaust gases from said exhaust gas conduit to flow therethrough.

9. A regenerable cartridge for an automotive muffler as set forth in claim 8 wherein said means for fixedly securing said opposite end portions of said sleeve to said opposite end portions of said base plate comprise crimped portions on said end portions of said base plate.

10. A regenerable cartridge for an automotive muffler as set forth in claim 9 wherein said base plate has rounded corners.

11. A regenerable cartridge for an automotive muffler as set forth in claim 9 wherein said opposite end portions of said sleeve comprise ragged sharp cut edges, and wherein said crimped portions enclose said ragged sharp cut edges.

12. A regenerable cartridge for an automotive muffler as set forth in claim 11 wherein said crimped portions are fabricated by turning over extreme outer end portions of said base plate onto adjacent portions thereof and confining said ragged sharp cut edges of said sleeve therebetween.

13. A regenerable cartridge for an automotive muffler as set forth in claim 1 wherein said elongated metal base plate has concave longitudinal edges.

14. A regenerable cartridge for an automotive muffler as set forth in claim 13 wherein said means for fixedly securing said opposite end portions of said sleeve to said opposite end portions of said base plate comprise crimped portions on said end portions of said base plate.

15. A regenerable cartridge for an automotive muffler as set forth in claim 14 wherein said base plate has rounded corners.

16. A regenerable cartridge for an automotive muffler as set forth in claim 14 wherein said opposite end portions of said sleeve comprise ragged sharp cut edges, and wherein said crimped portions enclose said ragged sharp cut edges.

17. A regenerable cartridge for an automotive muffler as set forth in claim 16 wherein said crimped portions are fabricated by turning over extreme outer end portions of said base plate onto adjacent portions thereof and confining said ragged sharp cut edges of said sleeve therebetween.

18. A regenerable cartridge for an automotive muffler as set forth in claim 7 wherein said base plate has rounded corners at opposite ends of said crimped portions.

19. A regenerable cartridge for an automotive muffler as set forth in claim 12 wherein said base plate has rounded corners at opposite ends of said crimped portions.

20. A regenerable cartridge for an automotive muffler as set forth in claim 17 wherein said base plate has rounded corners at opposite ends of said crimped portions.

* * * * *